Nov. 26, 1935.  N. B. RIDDLE  2,022,151
GRATER
Filed March 27, 1934  2 Sheets-Sheet 1
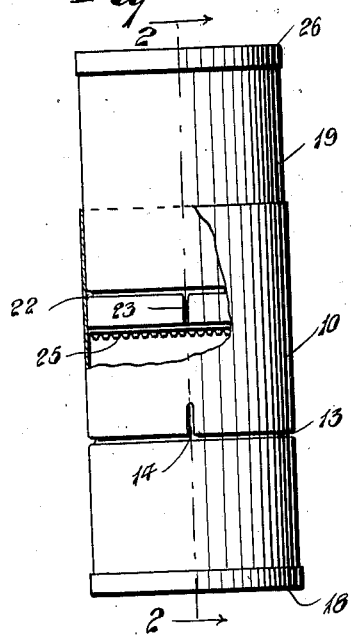
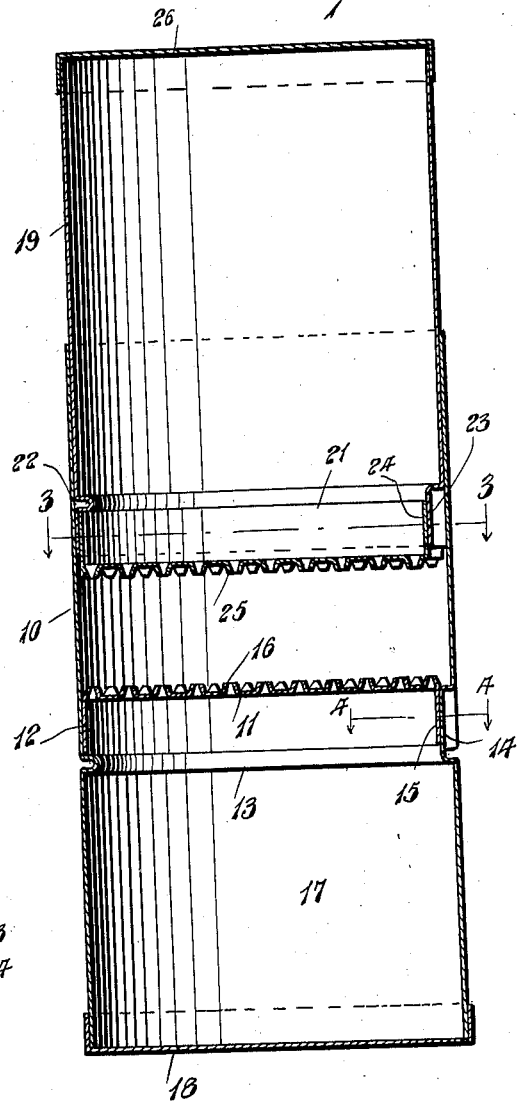
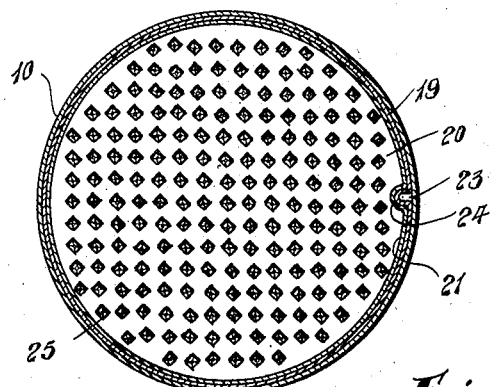
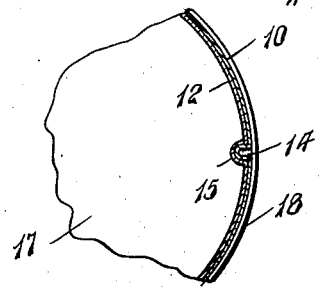
Inventor
N. B. Riddle Nov. 26, 1935.  N. B. RIDDLE  2,022,151
GRATER
Filed March 27, 1934  2 Sheets-Sheet 2
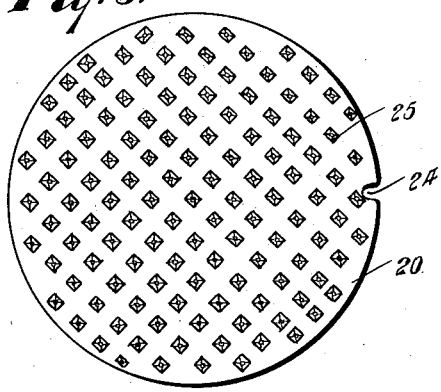
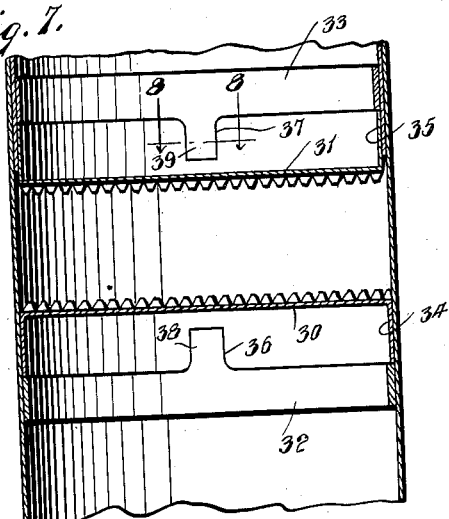
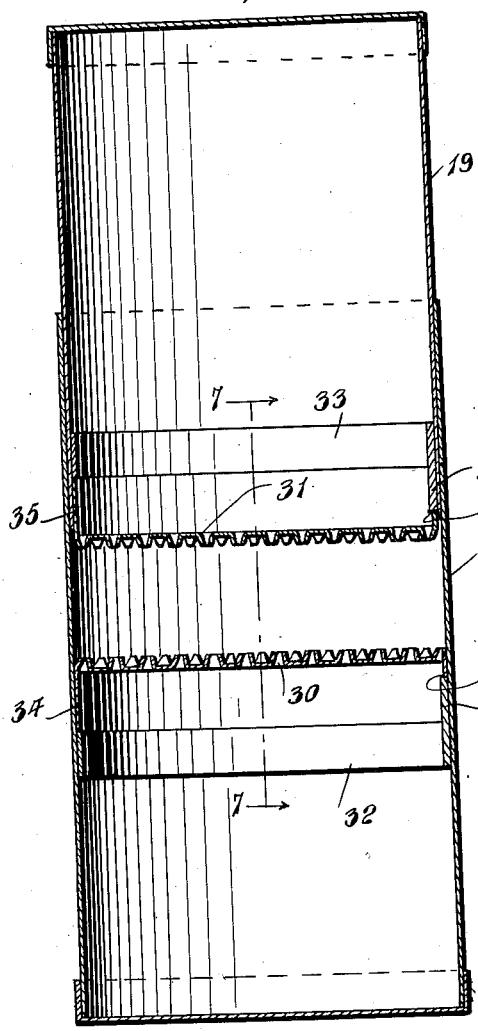
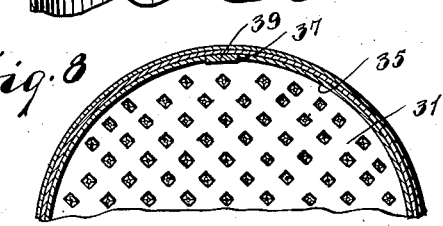
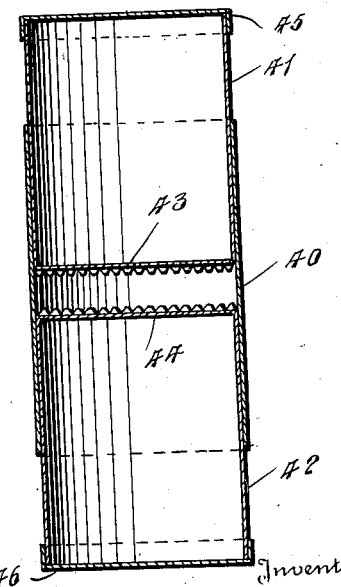
N. B. Riddle.
Inventor
Attorney Patented Nov. 26, 1935

2,022,151

UNITED STATES PATENT OFFICE 2,022,151

GRATER

Napoleon B. Riddle, St. Francisville, La.

Application March 27, 1934, Serial No. 717,646

2 Claims. (Cl. 146—177)

The invention relates to graters for comminuting nutmeg, nuts, cheese, and the like, and has for its principal object the provision of a grater that is reasonable in cost of production and that will quickly and efficiently grate different articles of food.

A further object of the invention is the provision of a grater comprising oppositely disposed and relatively rotatable grating members between which the material to be grated is held so that the process of grating the material may be accomplished without the necessity of holding the material manually, and the operation of grating will be done quickly and efficiently.

Additional objects and advantages of the invention will be apparent from the description hereinafter, and the invention will be found illustrated in the accompanying drawings, in which Figure 1 is a side view in elevation of the improved grater in assembled position, the view being partly broken away as shown in section, Figure 2 is a longitudinal sectional view on a plane indicated by the line 2—2 of Figure 1, the part being shown on an enlarged scale, Figure 3 is a transverse sectional view on a plane indicated by the line 3—3 of Figure 2, Figure 4 is a sectional detail on a plane indicated by the line 4—4 of Figure 2, Figure 5 is an end view of the removable container, Figure 6 is a sectional view similar to Figure 2 showing a slightly modified construction, Figure 7 is a fragmentary sectional view on a plane indicated by the line 7—7 of Figure 6, Figure 8 a sectional detail on a plane indicated by the line 8—8 of Figure 7, and Figure 9 a longitudinal sectional view of still another modification.

In the drawings similar reference characters are used to designate corresponding parts in all the views.

The fundamental principle of the invention is the provision of a grating structure wherein oppositely disposed grating disks are provided between which the material to be grated is placed, the grating disks being enclosed by a cylindrical casing, and provision made whereby the disks may be relatively rotated or oscillated so as to grate the material therebetween and dispense with the necessity of holding the grated material on the grating surface, thus making it possible to completely comminute or grate the material without endangering injury to the fingers in so doing.

In Figures 1 to 4 one form of the improved grater is disclosed in which there is provided a cylindrical casing 10 having a grating member 11 mounted therein by means of a circumferential flange 12 engaging an indented circumferential rib 13 formed in the cylindrical casing 10, said casing being preferably made of sheet metal. The casing 10 is also provided with a short longitudinal rib 14 extending from the rib 13 and the flange 12 is provided with an indented groove 15 that engages said rib 14 to hold the grating member 11 from rotation relatively to the casing 10. As shown in the drawings the grating member 11 that provides the grating disks, has a grating surface formed by pressing outwardly triangular tongues of the material, designated 16 and forming openings between groups of said tongues through which the grated material may pass through the grating disks on which said tongues are formed, into the compartment 17 in one end of said tubular casing, 18 designating a flanged cover or cap engaging the corresponding end of the cylindrical casing and forming a closure for said container.

19 designates a separable container that is adapted to be mounted in the cylindrical casing 10 facing the grating side of the grating disk hereinbefore described, and having on its inner end a grating member 20 similar in construction to the grating member 11, and provided with a circumferential flange 21 that engages an indented circumferential bead 22 in the wall of the container 19. 23 indicates an indented longitudinal bead extending from the bead 22 to the end of the container 19 and 24 an indented groove in the flange 21 that engages the bead 23 and holds the member 20 from rotation relatively of the container member 19.

The outer face of the member 20 is also provided with a grating surface consisting of triangular tongues 25 similar in construction to the grating surface of the tongues 16. 26 designates a closure cap and its flange as shown and slips on the outer end of the container member 19.

In operation it will be apparent that the material to be grated will be placed in the casing 10 and then the member 19 will be inserted in the position shown in the drawings and by relatively rotating the casing 10 and the member 19 the material will be subjected to a grating action and the comminuted or grated material will be deposited through the openings in the grating members 11 and 20 into the containers 17 and 19 from which the grated material may be discharged by removal of the caps 18 and 26.

In Figures 6, 7, and 8 a modified construction of the device is shown in which instead of the indented beads 13 and 14 and 22 and 23, the grating members designated 30 and 31, will be held in the casing 10, and 19, respectively, by means of annular straps 32 and 33 engaging the flanges 34 and 35, said flanges being provided with cut-out portions 36 and 37 to receive tongues or projections 38 and 39 extending from said annular straps 32 and 33.

In Figure 9 is shown still another modification in which the cylindrical casing 40 is open at both of its ends, and receives containers 41 and 42 by being inserted from opposite ends, the adjacent ends of said containers 41 and 42 having grating surfaces 43 and 44 similar in construction to the grating surfaces hereinbefore described, the device being operated in the same manner as that heretofore described, and the outer ends of the containers are provided with flanged caps 45 and 46 for discharging the grated material therefrom.

It will be apparent that by providing the removable grating members as designed in Figures 1 to 8 that grating surfaces for fine or course grating may be provided so that the device will be adaptable for use with different kinds of material and to produce gratings either fine or course as may be desired.

What I claim as my invention is:—

1. In a grater structure, a tubular casing, a circumferential flange extending inwardly of the side walls of said casing intermediate of its ends, a rib extending from said flange longitudinally of the casing, a grating disk removably mounted in said casing, a flange on said disk engaging said circumferential flange and having a recess engaging said rib, the grating disk having grating members and openings communicating with one end of the tubular casing, a cover on said end of the casing, a tubular container telescoping in the opposite end of said tubular casing, and a grating member on the inner end of said cylindrical container cooperating with said grating disk, said grating member having openings therein communicating with the interior of said container.

2. A grater as in claim 1, the tubular container provided with a circumferential flange extending inwardly of its side walls adjacent to one end, a longitudinal rib extending from said flange towards the adjacent end of the side wall of the container, a grating disk, a flange on said disk engaging said circumferential flange and provided with a recess receiving said rib, the grating disk provided with openings communicating with the interior of the container and a removable cover on the free end of the container.

NAPOLEON B. RIDDLE.